United States Patent [19]

Tivig et al.

[11] Patent Number: 5,056,059
[45] Date of Patent: Oct. 8, 1991

[54] MEDICAL MONITORING SYSTEM INTERFACE

[75] Inventors: Gerhard Tivig, Boeblingen; Wilhelm Meier, Herrenberg; Egon Pfeil, Aidlingen, all of Fed. Rep. of Germany

[73] Assignee: Hewlett-Packard Company, Palo Alto, Calif.

[21] Appl. No.: 617,372

[22] Filed: Nov. 19, 1990

Related U.S. Application Data

[63] Continuation of Ser. No. 253,813, Oct. 5, 1988, abandoned.

[30] Foreign Application Priority Data

Sep. 10, 1987 [EP] European Pat. Off. ........ 87114741.9

[51] Int. Cl.$^5$ .................. G09G 1/00; G06E 15/20
[52] U.S. Cl. .................. 364/900; 364/921.8; 364/922; 364/922.2; 364/922.3; 364/927.3; 364/927.63; 364/928.2; 364/928.4; 364/928.6; 364/948.11; 364/948.21; 364/413.02; 340/712
[58] Field of Search ... 364/200 MS File, 900 MS File, 364/413.02, 413.03, 413.05; 340/712; 128/774, 776

[56] References Cited

U.S. PATENT DOCUMENTS

| | | |
|---|---|---|
| 3,995,259 | 11/1976 | DePedro . |
| 4,028,695 | 6/1977 | Saich . |
| 4,425,627 | 1/1984 | Eibner .................. 364/900 |
| 4,454,576 | 6/1984 | McInroy et al. .................. 364/200 |
| 4,458,311 | 7/1984 | Clements et al. .................. 364/200 |
| 4,460,974 | 7/1984 | Jones .................. 364/900 |
| 4,484,304 | 11/1984 | Anderson et al. .................. 364/900 |
| 4,587,630 | 5/1986 | Straton et al. .................. 364/900 |
| 4,587,634 | 5/1986 | Ferrio et al. .................. 364/900 |
| 4,591,974 | 5/1986 | Dornbush et al. .................. 364/200 |
| 4,608,662 | 8/1986 | Watanabe et al. .................. 364/900 |
| 4,656,603 | 4/1987 | Dunn .................. 364/521 |
| 4,680,729 | 7/1987 | Steinhart .................. 364/900 |
| 4,782,463 | 11/1988 | Sanders et al. .................. 364/900 |
| 4,789,962 | 12/1988 | Berry et al. .................. 364/900 |
| 4,804,950 | 2/1989 | Moon et al. .................. 340/712 |
| 4,817,050 | 3/1989 | Komatsu et al. .................. 364/900 |
| 4,835,372 | 5/1989 | Gombrich et al. .................. 235/375 |
| 4,869,266 | 9/1989 | Taylor et al. .................. 128/774 |
| 4,870,561 | 9/1989 | Love et al. .................. 364/200 |
| 4,884,217 | 11/1989 | Skeirik et al. .................. 364/513 |

FOREIGN PATENT DOCUMENTS

| | | |
|---|---|---|
| 0122082 | 3/1984 | European Pat. Off. . |
| 196355 | 3/1985 | European Pat. Off. . |
| 0197700 | 3/1986 | European Pat. Off. . |

OTHER PUBLICATIONS

Marquette Operator's Manual for Series 7000 Four-Trace Bedside Assembly and Input Modules, Apr. 5, 1984, Revised Nov. 29, 1984, pp. 5-1 to 5-22.
Marquette Patient Monitoring Product Catalog, Fall 1989, pp. cover and 2 subsequent pages, 6-17, 20-25.

*Primary Examiner*—Stuart N. Hecker
*Assistant Examiner*—George C. Pappas
*Attorney, Agent, or Firm*—Richard F. Schuette

[57] ABSTRACT

An input device, in particular for a medical monitoring system, comprises a keyboard, a screen and a control processor. The keyboard comprises various hardkeys enabling access to an object mode in which the user may enter an object to be manipulated. Once an object is selected, the device enters a task/action mode in which the user may define an action to be performed on the selected object.

4 Claims, 10 Drawing Sheets

MEDICAL MONITORING SYSTEM INTERFACE

This is a continuation of co-pending application Ser. No. 07/253,813 filed on Oct. 5, 1988, now abandoned.

BACKGROUND OF THE INVENTION

This invention relates to an input device, in particular for a medical monitoring system, comprising a keyboard, display means and a processor connected with and/or controlling said keyboard and said display means.

A major problem for the designers of electronic instruments is the so-called man-machine-interface. Modern electronic instrumentation is not only used by technically experienced personnel like engineers, technicians etc., but also by personnel which is not very experienced in technical subject matter and sometimes even unwilling to operate complex instruments. An important and very critical example for such an application are all kinds of medical monitors. The man-machine-interface of such a monitor is the most sensitive component as the life or the health of a patient may depend on correct monitor controlling, whereas the operating personnel (nurses) usually is only experienced in medicine, but not in technique. Furthermore, the medical personnel is often in a stress situation when the monitor requires interaction. Therefore, ease of use and protection against malfunction caused by improper operation (e.g. suspend all patient alarms by accident) are decisive criteria for the design of the man-machine-interface and for the success of a monitor.

A lot of concepts for such man-machine-interfaces (also called human interfaces) are known in the art. A very simple concept is, of course, to assign a button, control knob or the like to any function or operating mode of the monitor. A lot of prior art monitors used this concept. Unfortunately, it does not work with complex, multi-functional monitors as the immense number of control buttons necessary for such a monitor would confuse the operating personnel and sometimes even lead to misadjustment. Attempts to overcome this disadvantage like cover doors covering those keys which are not required for normal operation are also limited to small or medium size monitors. In addition, the concept "one button—one function" is absolutely unapplicable for configurable monitors (e.g. monitors with no fixed physiological parameter/channel relation).

Of course, the number of necessary buttons/knobs could be reduced by the use of one or more shift keys (as used in keyboards, pocket calculators etc.), but that would neither simplify the operating concept nor increase the transparency of the system.

Use of a normal, typewriter-like alphanumeric keyboard is only a solution for special cases as this requires a lot of familiarity with keyboard operation, experience with the system and readiness to spend time for man-machine interaction. Furthermore, the cramped environment in most medical applications does not allow to install such keyboards.

Another prior art concept which came up a couple of years ago is the use of softkeys, i.e. keys without a fixed label and with dynamically assigned function. The currently valid meaning of such a softkey is indicated by display means, e.g. softkey labels on a screen. By use of such softkeys, the necessary number of keys can be reduced drastically.

Prior art softkey concepts operate in the following way: In basic operation mode, some of the softkeys (at most all but one) are assigned to a specific function of the monitor. One of the softkeys is a "NEXT" or "CONTINUE" key which allows the user to step through a number of operating levels. Whenever the "NEXT" or "CONTINUE" softkey is pressed, the other softkeys are assigned different meanings which are indicated by appropriate softkey labels. Therefore, this concept enables the user to step through various operational levels. It is also possible to implement softkey operation in the form of a tree structure which guides the user by way of "yes/no" decisions to the final function.

Unfortunately, both softkey implementations are somewhat disadvantageous. The top-down structure is merely a modification of the "shiftkey" concept as the "NEXT" key could also be replaced by an appropriate number of shiftkeys. In this concept, the user can only recognize the current meaning of a key but not the "hidden" functions when he is in a certain operating level. Unexperienced users or users without technical background are often confused by such a concept.

The tree-structure concept-on the other hand-requires a lot of decisions and, therefore, a lot of thought. Users (such as nurses) who do not have enough time to concentrate on monitor operation may therefore be frustrated.

Both concepts are insofar inconsistent as they simply offer a multiplicity of choices, but do not implement a uniform, easy-to-learn model.

It is a major objective of the present invention to provide an input device which is not only easy to use but also implements a uniform, easy-to-learn concept allowing easy access to the various monitor functions.

SUMMARY OF THE INVENTION

According to one aspect of the present invention, this problem is solved by the following features:

The keyboard of the input device comprises at least one hardkey incorporating a predefined entry to a logic machine, said logic machine being represented by a set of control instructions stored in a memory block to be executed by the processor controlling the input device, said processor is programmed to transfer control to the associated logic machine whenever said hardkey is pressed, said logic machine comprises a first operating mode in which the user may select an object to be manipulated, and a second operating mode in which the user may define an action to be performed on the selected object.

According to the terms used herein, a hardkey is a key with a fixed meaning (e.g. with imprinted label).

In a preferred embodiment, the new input device comprises multiple hardkeys, each hardkey defining an entry to a specific logic machine. Hardkeys and associated logic machines may be provided, for example, for fundamental functions of a monitor or a system; in the case of a medical monitor, such global functions could be alarm setting, instrument configuration, parameter configuration or the like. As these globals are depicted as hardkey labels, they are always visible for the user and therefore easy (and equally) accessible.

Whenever such a hardkey is pressed, the control processor transfers control to the associated logic machine. The logic machine first enters an operating mode in which the user may select an object to be manipulated, and, when that has happened, it enters a second operating mode in which the user may define an action to be performed on the selected object.

The structure of each of said logic machines therefore follows the grammar of a sentence. First of all, the user has to define an object, and then he will have to select an action to be performed on that object. This structure equals the subject and the predicate of a sentence and is therefore easy to learn as the concept reflects the "everyday logic" of the user.

A major advantage of the present input device is that it implements a consistent operating structure. For every action to be performed, always three operating levels are required (hardkey entry, object selection and action selection), never more and never less. Furthermore, all three operating levels always have the same meaning (and, preferably, the same appearance).

The conceptual model is to support users' knowledge about system organization, how the system works and how it can be used to accomplish tasks. Once the user has learned this model of operating, he will extrapolate over the rest of the system (build-up his own model), i.e. if he has once performed some tasks and thereby learned the system concept, he will expect that unknown tasks could be performed in a similar manner. If the system is consistent as the present one, the user's prediction will work more often than not, and the system will appear to be easier to learn and to use. Thus, the user can be preserved from frustration. He is encouraged to perform new functions as long as operation is predictable.

This leads to another important advantage of the present invention. The three-level operating concept realized herein is self-explanatory for the beginning user (in particular, if an additional HELP function is provided) and thus reduces user learning time. On the other hand, the experienced user has fast access to all tasks. Prior art input devices cannot meet both requirements: Either they offer fast access to specific tasks (in which case they are difficult to operate for the unexperienced user), or they guide the beginning user step-by-step (in which case access to a specific task is very laborious).

Another advantage is that the input device according to the invention requires only a minimum number of key operations and that the "logic machine" concept is easy to implement.

It is understood that an input device according to the present invention may not only be used in medical monitoring applications, but also in the operating room or the intensive care unit of a hospital. Furthermore, it may be used in many other (also non-medical) applications such as accounting, storekeeping or the like.

Advantageously, in said first operating mode a one- or two-dimensional menu of objects is displayed on the screen. Whenever the user has pressed a hardkey, he has the opportunity to select a specific object in that menu. In a preferred embodiment, such a menu of objects is displayed in "window technique", i.e. the menu is presented as an overlay covering part of the basic information on the screen. In that case (but also in other cases), it is advantageous to have said menu of objects window-shaped and/or framed.

Access to a specific task is even easier and faster if multiple input means are provided for. Of course, the first operational level always requires that a hardkey is pressed; but in the further operating levels, multiple input means are preferred. Such could be, for example:

a) softkeys (keys with no imprinted label and varying meaning according to an associated softkey label displayed on the screen),
b) arrow keys (up/down, left/right keys),
c) multiple hit function of the entry key (the key which was the entry to the underlying operational level can be pressed repeatedly to step through various choices),
d) touchscreen input (the screen is surrounded by phototransmitters and photoreceivers and the user has simply to touch a certain field on the screen to select the associated function),
e) a confirm key (a function is only selected if the confirm key was pressed).

Of course, it is possible to provide only some or all of said input means to simplify operation for the user.

When presenting a menu of several choices on the screen, preferably one of the screen labels is indicated as being "active" or "selected". This can be achieved, for example, by displaying labelled rectangles in half-bright inverse video, the active/selected rectangle being in full-bright inverse video. The indication of the active label may, of course, also be achieved by other techniques, for example, normal half-bright and full-bright video labels. It is also possible to indicate an "active line" in full-bright inverse video and the active key in that line by an additional arrow if the display shows a multiplicity of softkey lines (the non-active lines are represented in half-bright inverse video in this case).

According to another aspect of the invention, each logic machine comprises at least one task controller performing the second operating mode, said task controller comprising at least one task menu in which the user may select a task, and at least one action menu associated with a specific task in which the user may select an action to be performed on the selected object.

Introduction of such a task controller (preferably, each logic machine comprises several of said task controllers) simplifies selection of a specific action. On each selected object, various tasks may be performed: For example, if the selected object is the ECG (electrocardiogram) channel of a medical monitor, lead selection, wave size or bandwidth of a hardware or software filter may be tasks. Within each of these tasks, a specific action may be selected: for example, change lead to aVR or change bandwidth to "monitor" mode. It is advantageous to have an action selected in this two-step procedure as the whole system becomes more consistent and transparent for the user. Still the whole number of operational levels has not to be increased beyond three if, according to a further aspect of the present invention, the task controller is programmed to display at least one task menu and at least one action menu simultaneously on the screen, and if at least two input modes are provided for, one of said modes being provided to alter a selected task and the other to select a specific action in the active task. In this case, a further menu—the task menu—is used to select a specific task (preferably, said task menu is displayed as softkey labels associated with softkeys to provide said first input mode); the second menu—the action menu—is used within said task (preferably, for said second input mode various input means are provided for, such as arrow keys, multiple hit operation of the active softkey, touchscreen input and/or a confirm key to enter an action). In a preferred embodiment, the action menu is further displayed as a framed window, the frame having an opening and the ends of said frame being linked with at least one of said softkey labels, i.e. indicating the active and currently selected task. This is especially advantageous when using a window technique.

When displaying the task menu and the action menu simultaneously on the screen, it is understood that always one task has to be "active" or "selected", the action menu containing choices of actions to be performed on the selected task. In a certain preferred embodiment, all but one of possible tasks are displayed as half-bright inverse video softkey labels, the active/-selected task being highlighted, i.e. being in full-bright inverse video. A window with a lasso-like frame—the ends of said lasso being linked with the active softkey label—contains the action menu associated with the active/selected task.

It is understood that the "task" level is not mandatory, but advantageous for an input device according to the present invention. The "task" level may also be omitted, in which case the user may directly access an action after having selected the object. On the other hand, selection of a task and an action under control of a task controller may also be achieved without prior selection of an object, i.e. a task controller as described above may also be used without connection to a logic machine as described herein. In that case, the object could, for example, also be selected when the task menu and the action menu are just processed.

An input device as described above may further comprise a "HELP" key. According to one aspect of the invention, the processor is programmed to enter a help subsystem whenever that key is pressed, said help subsystem providing specific help information when an object, task or action is active (selected) and general help information in all other cases.

In the new operating structure as proposed herein, the "HELP" function is therefore more specific as help information can be provided on a general basis if no object, task or action is active; on the other hand, if one of them is active, help information can be given on the selected (e.g. highlighted) function. By way of this specific help information, it is also possible to "look behind" a certain function before executing it.

According to a further important aspect of the present invention, the keyboard comprises at least one hardkey incorporating a predefined entry to a logic machine (object key) and at least one hardkey associated with a certain action to be performed (immediate action key). Such a design is useful if actions must be performed without any delay, such as to capture a transient wave on the screen. Therefore, the control processor executes the associated action immediately if one of the immediate action keys was pressed; if an object key was pressed, it transfers control to the associated logic machine as described above. It is understood that the object key/immediate action key layout of the keyboard is independent of the further processing of an object key.

The object key/immediate action key layout increases in any case the applicability of the system and guarantees easy and fast access to all monitor functions.

If immediate action keys are provided for, it is advantageous if the processor is programmed to enter a request mode after having executed an action associated with said immediate action key for the purpose of requesting additional action-related information from the user. This ensures that the action is, as requested, performed immediately; but still the user has the opportunity to identify the event which required immediate action.

The certain aspects of the present invention as described above are especially helpful in an input device for a medical monitoring system. In that case, the screen contains physiological waves, trends and/or patient data during normal operation, and it is advantageous to have all menus displayed as framed windows partially covering said waves. By use of said "window technique", the user—especially the unexperienced user—will not be confused by sudden disappearance of all patient waves. Furthermore, some of the waves—in particular, the physiologically most important waves like the ECG—remain visible even during the selection of an object, a task and/or an action. If an action menu is provided for, a copy of the physiological wave associated with the selected object may additionally be copied into the action menu together with numerics and status information to simplify menu identification and display of the current settings.

The present invention further relates to a method for entering data into an input device wherein a processor transfers control to a logic machine whenever a hardkey associated with said logic machine is pressed, said logic machine first entering a first operating mode enabling the user to select an object to be manipulated and, when the user once has selected an object, said logic machine entering a second operating mode enabling the user to select an action to be performed on the selected object. Advantageously, in said second operating mode, the logic machine transfers control to a task controller associated with the selected object, said task controller enabling the user to select a task via a task menu and to select an action associated with said task via an action menu.

BRIEF DESCRIPTION OF THE DRAWINGS

An input device embodying the invention will now be described—by way of a non-limiting example—with reference to the accompanying drawings, in which:

FIGS. 7 and 8 depict screen and keyboard in object entry mode, FIG. 9 depicts screen and keyboard in task/action entry mode, and FIG. 10 depicts screen and keyboard when marking an event subsequent to the occurence of "immediate action".

DESCRIPTION OF THE PREFERRED EMBODIMENT

Figure 1:
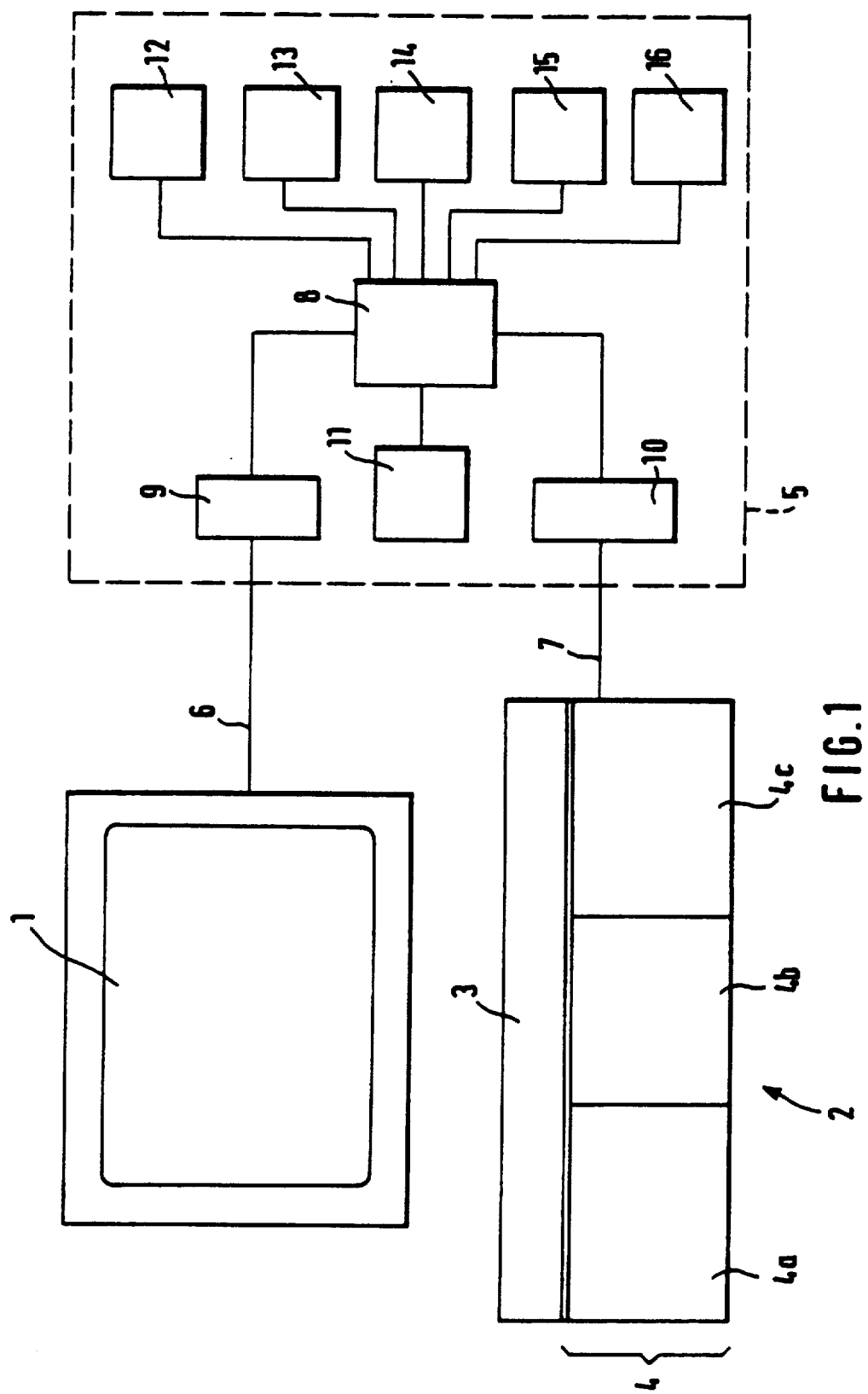
FIG. 1 is an overall block diagram of an input device according to the invention.

The block diagram of FIG. 1 shows the primary components of an input device for a medical monitor. Reference number 1 depicts a CRT screen (preferably multi-colored) for the display of physiological waves, trends, alphanumerics and for data entry.

Keyboard 2 comprises several groups of keys, in particular:

1. a softkey group 3—these softkeys do not have imprinted labels and have dynamically assigned meaning, the current meaning being displayed on screen 1 by means of softkey labels; and
2. a group of hardkeys 4 (with imprinted label). The hardkey group can further be divided into a group of object keys 4a, a group of immediate action keys 4b and a group of keys with other or special meaning 4c.

Reference number 5 depicts a processor system connected with screen 1 and keyboard 2 via lines 6 and 7. Signals on these lines are transmitted by and received from processor 8 via appropriate interfaces 9 and 10. Processor 8 may be the system processor which also controls the operating system and the front end hardware (not shown) or it may be a specific input device processor. In non-entry mode, processor 8 executes the instructions stored in a control memory 11. Whenever one of the object keys 4a is pressed—as will be explained later—, control is transferred to one of logic machines 12 to 15 (processor 8 then executes the instructions stored in the associated memory blocks) or, if an immediate action key 4b was pressed, to immediate action processor 16.

Figure 2:
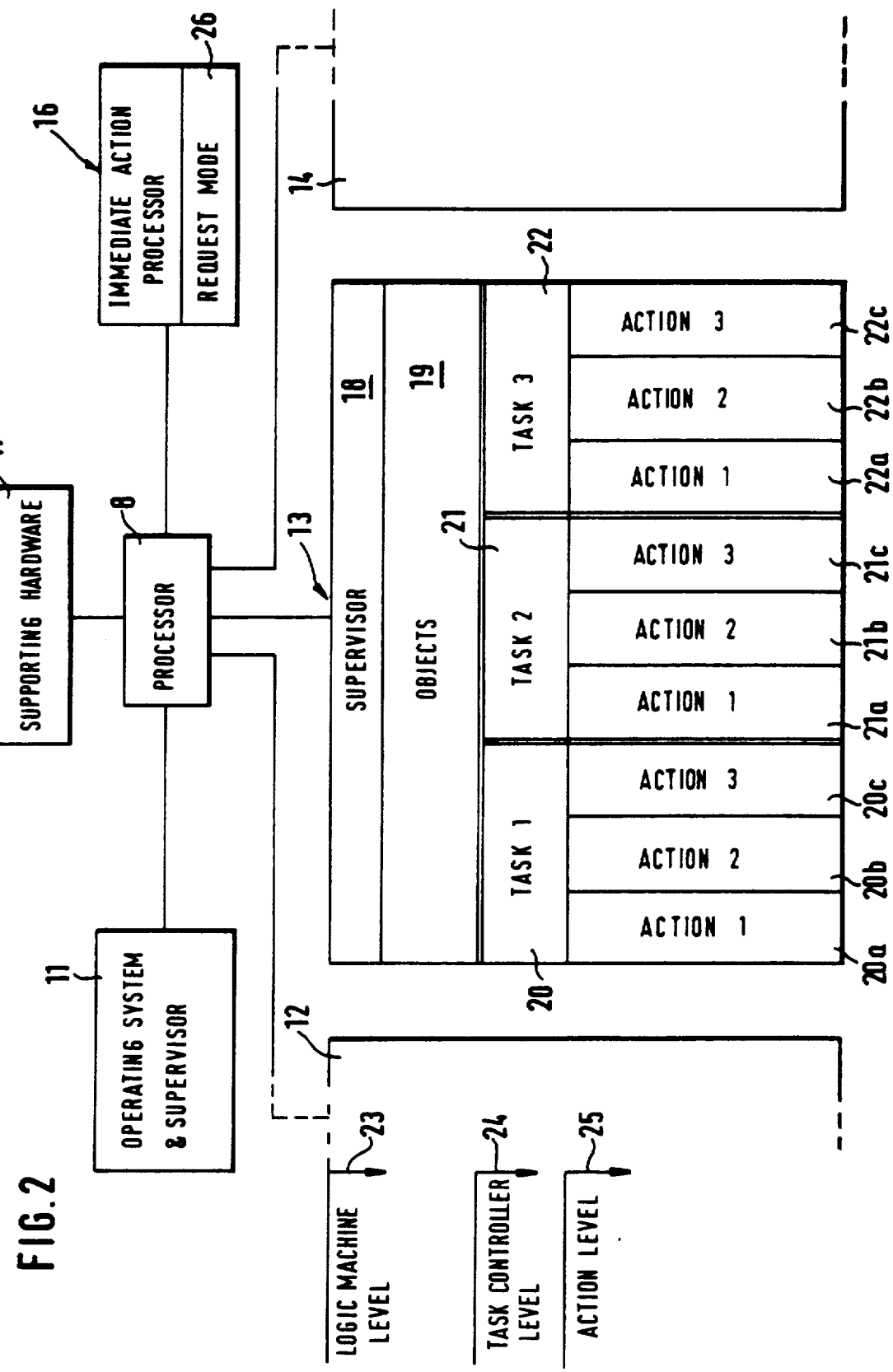
FIG. 2 is a detailed diagram of processor environment.

FIG. 2 depicts a detailed block diagram of the processor system. Processor 8 is connected with additional supporting hardware 17 which comprises the hardware necessary to run the processor, like clock generator, address decoders, interfacing etc. In non-entry mode, processor 8 is operated under control of an operating system and a supervisor program, respectively, contained in control memory 11. If an object key is pressed on the keyboard, control is transferred to a logic machine (by way of an example, logic machines 12 to 14 are shown in FIG. 2). As illustrated by way of logic machine 13, such a logic machine—which is represented as a set of control instructions stored in a memory block—implements various operational levels. Each logic machine consists of a supervisor 18 and a block of instructions 19 implementing object entry mode (as will be explained below). Logic machine 13 further comprises three task controllers 20, 21 and 22, the task controllers themselves providing actions to be performed 20a to 20c, 21a to 21c and 22a to 22c.

Arrows 23, 24 and 25 indicate the various operational levels in a logic machine (logic machine level, task controller level and action level).

The processor system further comprises an immediate action processor 16 which becomes activated if an immediate action key 4b was pressed. That immediate action processor comprises a "request mode" subsystem 26 (explained below).

Figure 3:
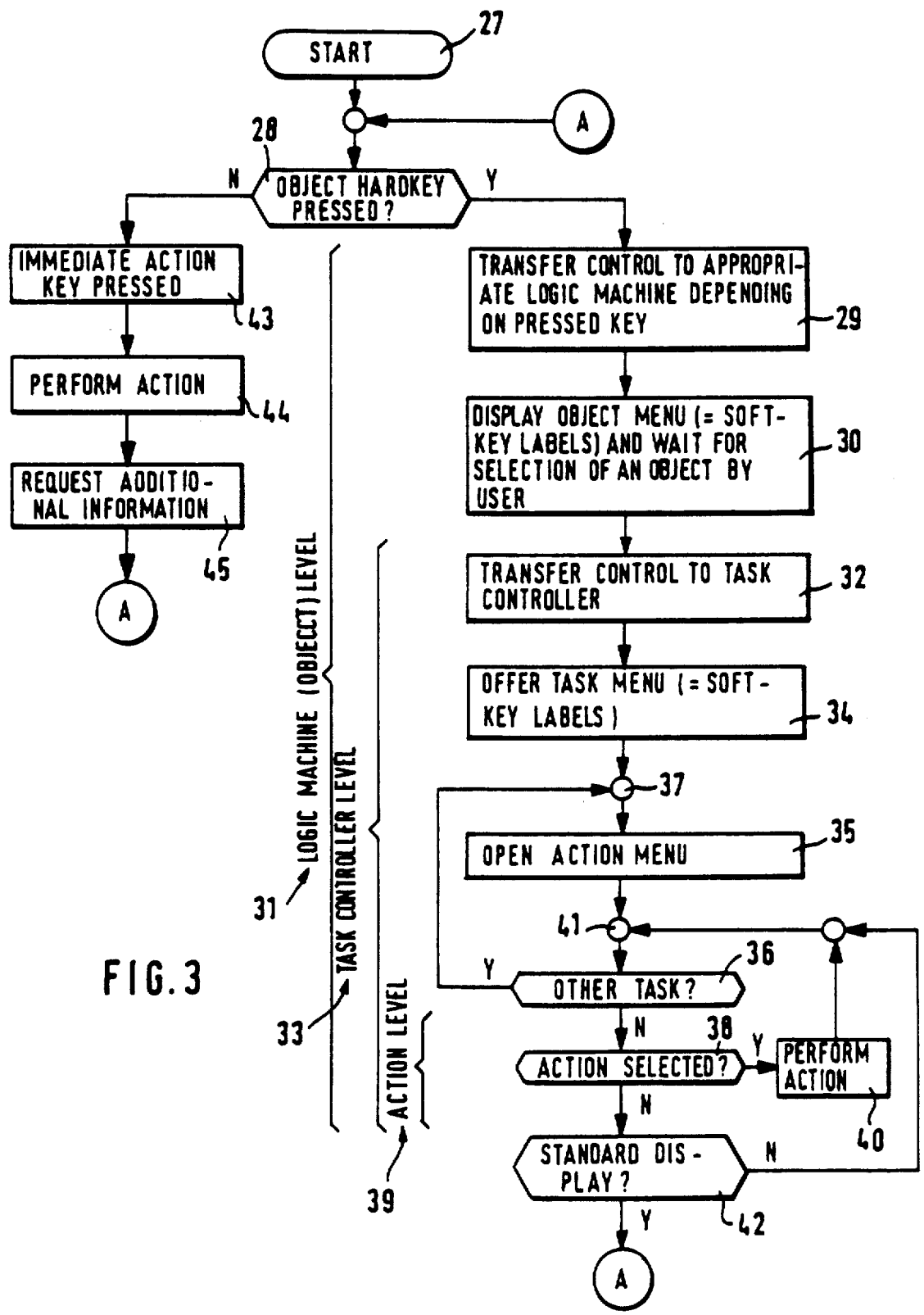
FIG. 3 is a general flow chart of processor operation.

FIG. 3 contains a general flow chart of processor operation. The flow chart is entered at 27 whenever a key was pressed. At 28, the processor decides whether the pressed key was an object hardkey or not. If yes, control is transferred to the logic machine associated with the pressed key (Ref. No. 29). The logic machine then enters object entry mode, i.e. displays an object menu and waits for selection of an object by the user (Ref. No. 30). In this stage (which belongs to the logic machine level or object level as indicated by 31) the user may select an object to be manipulated. The object menu is displayed as softkey labels, and pressing a selected softkey will cause the machine to proceed to the next step. The input device also provides other input means than softkeys; in particular, a certain object may also be selected by use of arrow keys, touchscreen input or a confirm key.

The softkey labels are displayed in half-bright inverse video, one of said labels (or a line of labels) being in full-bright inverse video and indicating the "active" or "selected" softkey(s). By use of arrow keys, the "active" softkey may be altered (from right to left and left to right and—if more than one softkey label line is provided—up and down and down and up). By use of the confirm key, the active softkey may be selected. Touch screen input or pressing a certain softkey leads immediately to the selection of that softkey. Another entry mode is the so-called "multiple hit operation" of the entry hardkey; the entry hardkey is the hardkey which was pressed to enter a certain logic machine, and hitting that key multiple times allows "stepping" through the softkey labels or through the softkey label lines. Selection of the softkey can—in this case—also be performed by hitting the confirm key.

Once an object is selected, the logic machine transfers control to the task controller of the selected object (Ref. No. 32, cf. task controller level 33). The task controller displays a task menu on the screen (Ref. No. 34); this task menu consists of softkey labels in half-bright inverse video, one (or more) of the softkey labels being displayed in full-bright video which indicates the active or selected softkey(s). Another task may be selected by hitting another softkey. Upon entry to the task controller level, the leftmost softkey label (preferably the most frequently used function) is highlighted and thereby indicated as active.

Said task controller further opens an action menu associated with the currently active task. If, for example, the display size of an ECG is selected as task, the action menu contains various highlighted rectangles, each indicating a specific ECG size. All of these rectangles but one are displayed in half-bright inverse video and one of them—the active one—in full-bright inverse video. Selection of an action is performed by various input means such as arrow keys, touch screen input, a confirm key or multiple hit operation of the currently active task softkey. The other softkeys are not used to select an action as they are reserved for task input.

Display of the action menu is referred to as 35 in FIG. 3.

The system waits now for task or action selection. If, as indicated by 36, another task is selected by hitting the appropriate softkey, operation returns to Ref. No. 37; the softkey label associated with the hit softkey is highlighted, i.e. turned to full-bright inverse video, and the action menu associated with the selected task is displayed.

If a specific action is selected as indicated by 38 (the system operates now in the action level 39), the selected action is performed (40), and the system returns to task/action selection input mode (41). That input mode may only be left if the "standard" key—one of the special hardkeys—is pressed; the system never returns automatically to object input mode if an action was performed—such happens only if the "standard" key was operated. This is depicted in FIG. 3 by Ref. No. 42—if standard display was selected, operation returns to label "A", i.e. the standard display which allows object input via the object hardkeys.

As just mentioned above, the keyboard further comprises so-called "immediate action keys". These are hardkeys providing an operation mode in which an action may be performed without any delay. This could be of importance in the case of transient events.

If the processor detects at 43 that an immediate action key was pressed, it performs the action without any delay as indicated by 44. (Examples for such immediate actions will be given below). After having performed the action, it requests additional information from the user for the purpose of identifying the immediate action later on (Ref. No. 45). Then operation returns to the standard display, i.e. label "A".

Figure 4:
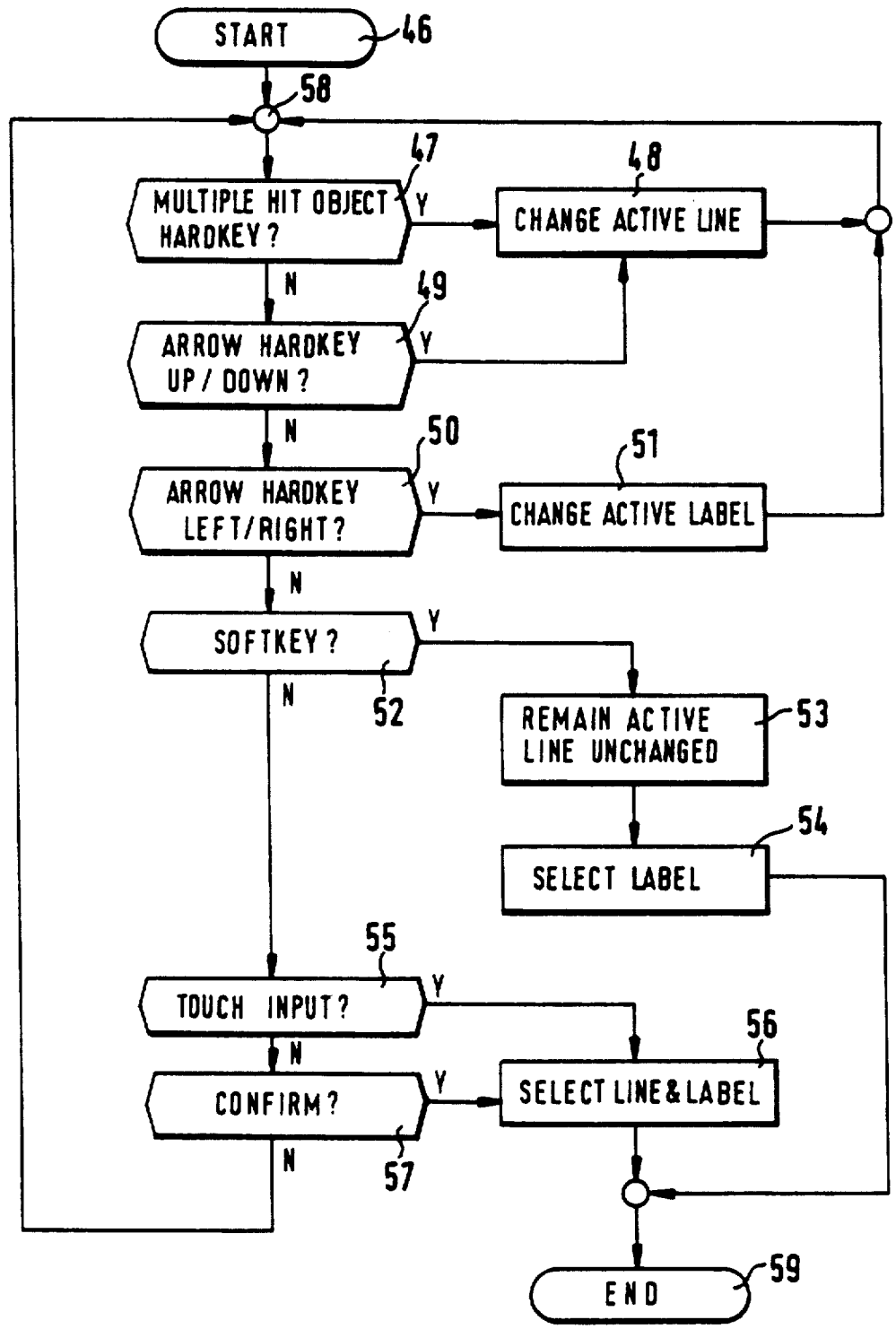
FIG. 4 is a flow chart of the input sequence in object entry mode.
Figure 5:
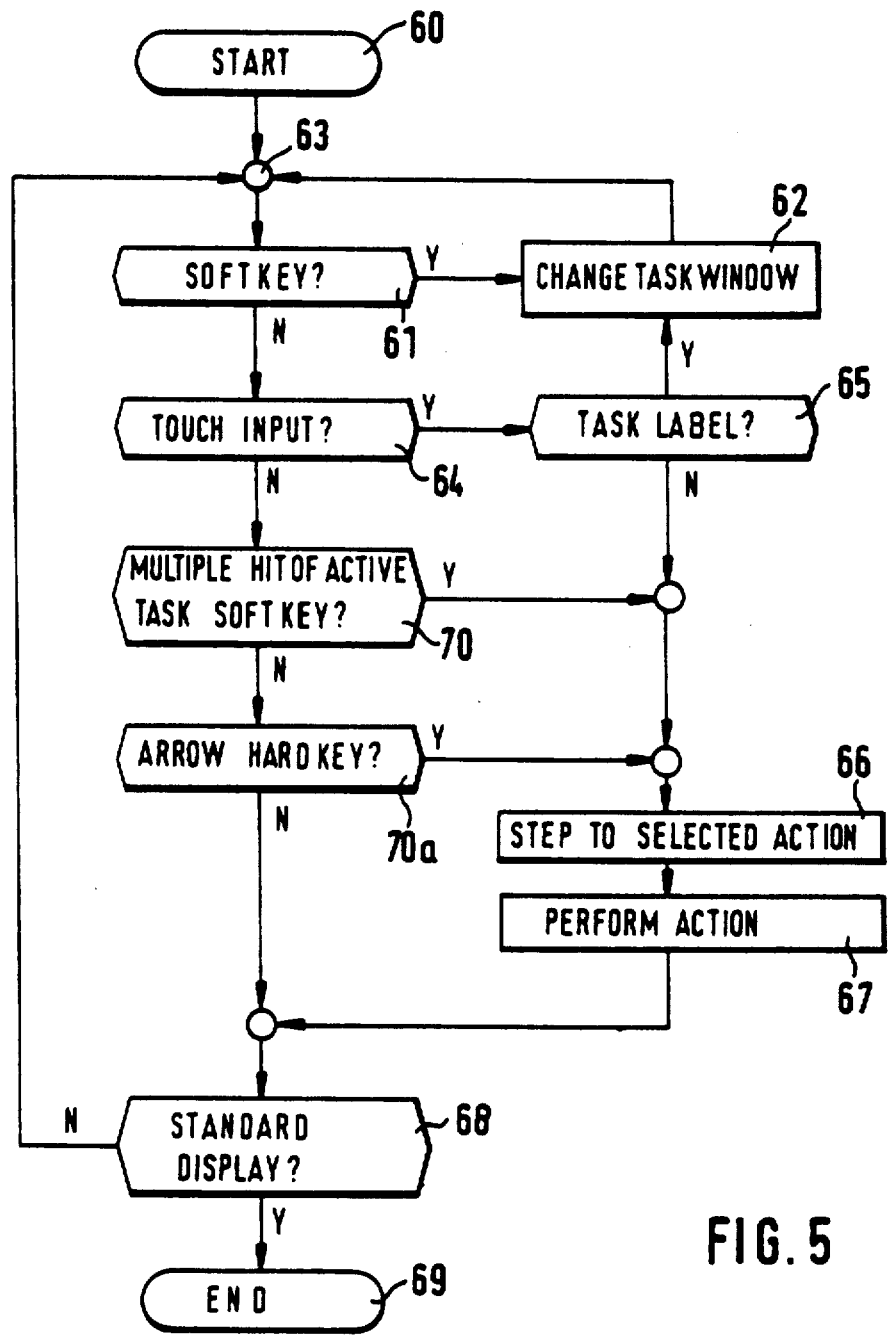
FIG. 5 is a flow chart of the input sequence in task/action entry mode.

FIGS. 4 and 5 show flow charts of input operation if softkeys, arrow keys, touchscreen input, confirm key and multiple hit operation of the entry key are available as input means. It is understood that an input device according to the present invention must not necessarily comprise all of that input means.

The flow chart of FIG. 4 is entered at "start" label 46 when an object hardkey was pressed. In that state, the line of softkey labels allowing selection of a specific object by the user is displayed on the screen. The "active" softkey is indicated by full-bright inverse video of the associated softkey label; all other softkey labels are displayed in half-bright inverse video. In applications where more than one line of softkey labels is necessary (e.g. the number of objects exceeds the number of softkeys), one of the softkey lines is highlighted, and the "active" softkey is indicated by an arrow (see below). The process as described in the flow chart of FIG. 4 is based on multiple softkey label lines.

If the object hardkey (i.e. the entry hardkey to a specific mode) is hit multiple times as indicated by 47, the active line is changed (48). This means that the highlighted (full-bright inverse video) softkey label line changes. The arrow pointing to the active softkey changes its position in vertical direction, but not horizontally. The same applies if an "up/down" arrow hardkey is pressed (49).

If a "left/right" arrow hardkey is pressed as indicated by 50, the active softkey label changes its position in horizontal direction as indicated by 51.

In case a softkey is hit (52), the active line remains unchanged (53), and the softkey label in that line associated with the hit softkey is selected (54). If a specific label is selected by touch input (55), the touched line and label are selected (56).

An additional "confirm" key is used to enter the selected object if only multiple hit or arrow hardkeys are used to select an object (this is not necessary upon softkey or touch input as, in those cases, the object is selected directly). Hitting the confirm key (57) causes selection of the currently active softkey in the currently active softkey label line (56).

If no object was selected, operation returns to the entry point as indicated by 58. Otherwise, the selection process is finished ("end" label 59), and control is transferred to the task controller.

FIG. 5 contains a flow chart of task and action selection when the object was just selected. In this process, the softkeys are used to alter the selected task, and all other input means are used to select an action to be performed on that task.

Entry point is "start" label 60. Upon hit of a softkey (61) (not the active one), which corresponds to the selection of another task, the task window is changed (62), and operation returns to entry point 63.

Touch input (Ref. No. 64) may cause a change of the selected task. This is true if a task label, i.e. a softkey label was touched (cf. "yes" branch after inquiry 65). If the field touched on the screen was, on the contrary, a field in the action menu ("no" branch), the selected action becomes active (66), and the selected action is performed (67). If, then, the "stardard" key is pressed (68), the process is finished as indicated by Ref. No. 69; otherwise, operation returns to entry point 63.

Another input means is multiple hit of the active task softkey (70). For the same purpose, arrow hardkeys may be used (70a).

In contrast to object mode entry, no confirm key is necessary in the task level as the currently active action is always performed immediately.

Figure 6:
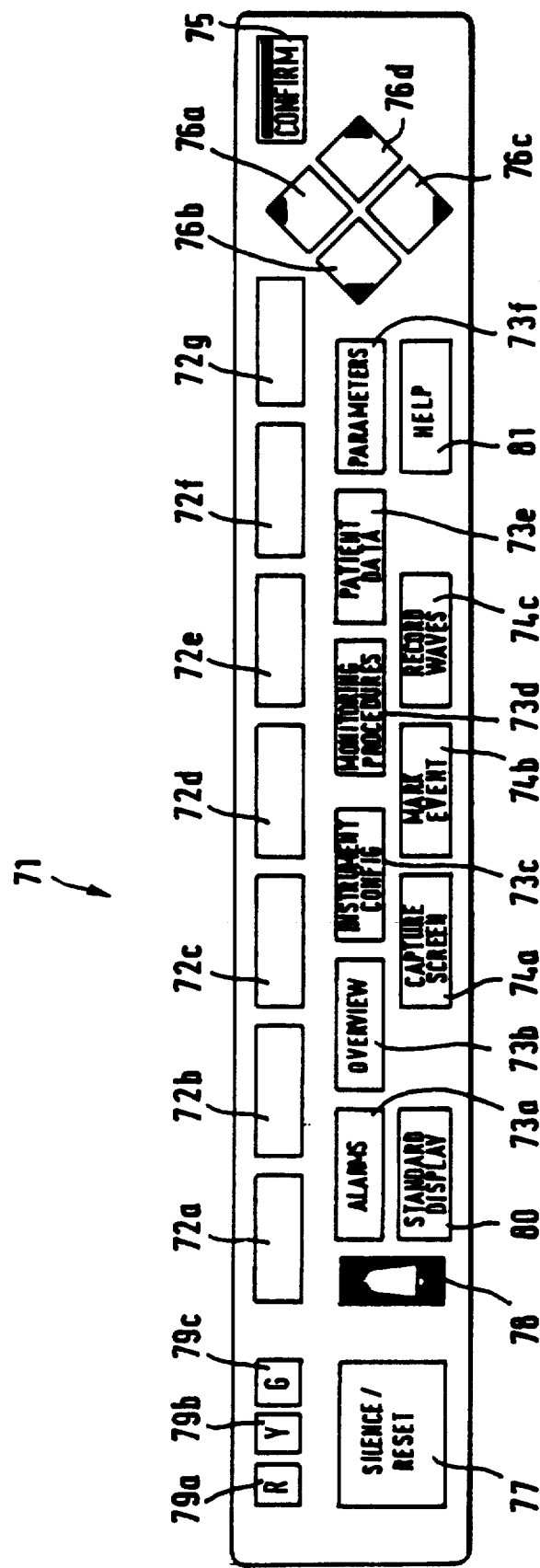
FIG. 6 is the overall layout of a keyboard of a medical monitor.

FIG. 6 depicts the layout of a keyboard of an input device according to the present invention. This keyboard is especially designed for a medical monitor, but it is understood that the invention comprises all kinds of input devices, e.g. for other monitor/computer etc. devices.

The keyboard is generally referred to as Ref. No. 71. It comprises a set of softkeys 72a to 72g with no imprinted label. The meaning of these softkeys is dynamically assigned by appropriate softkey labels on the screen. Therefore, the softkeys are placed in the uppermost row of keys.

Keys 73a through 73f are the so-called "object hardkeys". These keys allow specific entry to object mode and do not change their meaning. In the shown example, the "alarms" key 73a allows access to all alarm functions of the monitor. The "overview" key 73b enables access to the monitor network, especially to all connected patient beds. "Instrument configuration" (key 73c) is used to alter the basic configuration of the monitor, and "monitoring procedures" (key 73b) supports calculations etc. The "patient data" key (73e) is used to recall the medium and long-time history of a patient (so-called trends), and the "parameters" key (73f) offers configuration of the single parameters to be measured, e.g. ECG, respiration, pressure or the like.

Keyboard 71 also comprises a set of "immediate action keys" 74a to 74c. These hardkeys are used to perform actions without any delay, for example to capture transient events. Preferably, their labels have another colour than the labels of the object hardkeys.

The "capture screen" key (74a) freezes the display and allows various internal operations such as to copy waves or to print a hardcopy of the complete screen. The "mark event" key (74b) may be used to mark exceptional events, and the "record waves" key (74c) starts a recorder.

The keyboard further comprises some special hardkeys, for example the "confirm" key 75 and the arrow keys 76a to 76d (used to alter an active softkey or an active softkey line). As these arrow keys are only operable in certain logic states (i.e. there are conditions under which they cannot be operated), they preferably include an optic indication, e.g. a backlighting module or a light-emitting diode (LED). Whenever an arrow key can be operated, its associated LED or backlighting module is turned on thereby indicating readiness. If, for example, only the "up/down" arrow keys can be operated in a certain logic state, their optic indicators are turned on, whereas the optic indicators of the "left/right" arrow keys remain dark.

A "silence/reset" key 77 is used to acknowledge patient alarms and to restart the alarm cycle. That key and its meaning are well-known in the art and are not directly related to the present invention. The same applies to the "alarms suspended" lamp 78. Red, yellow and green lamps 79a to 79c indicate the type of an alarm.

The "standard display" key (80) is a permanent return key which allows to return to the standard display from object or task mode. As outlined above, the input device does not return to the standard display automatically.

Help is provided by "HELP" key 81. As described above, general help messages are provided as well as specific help, i.e. information about an active softkey label.

FIGS. 7 to 10 show an operation example of an input device according to the present invention for a medical monitoring system. The screen of the monitoring system is generally outlined as 82 and the keyboard as 83 in FIG. 7. Screen or display 82 shows two realtime ECG waves 84 and 85 of a patient, the heart rate 86 and the pulse 87. An additional realtime wave 88 shows the arterial blood pressure (ABP) and the associated numerics 89.

Figure 7:
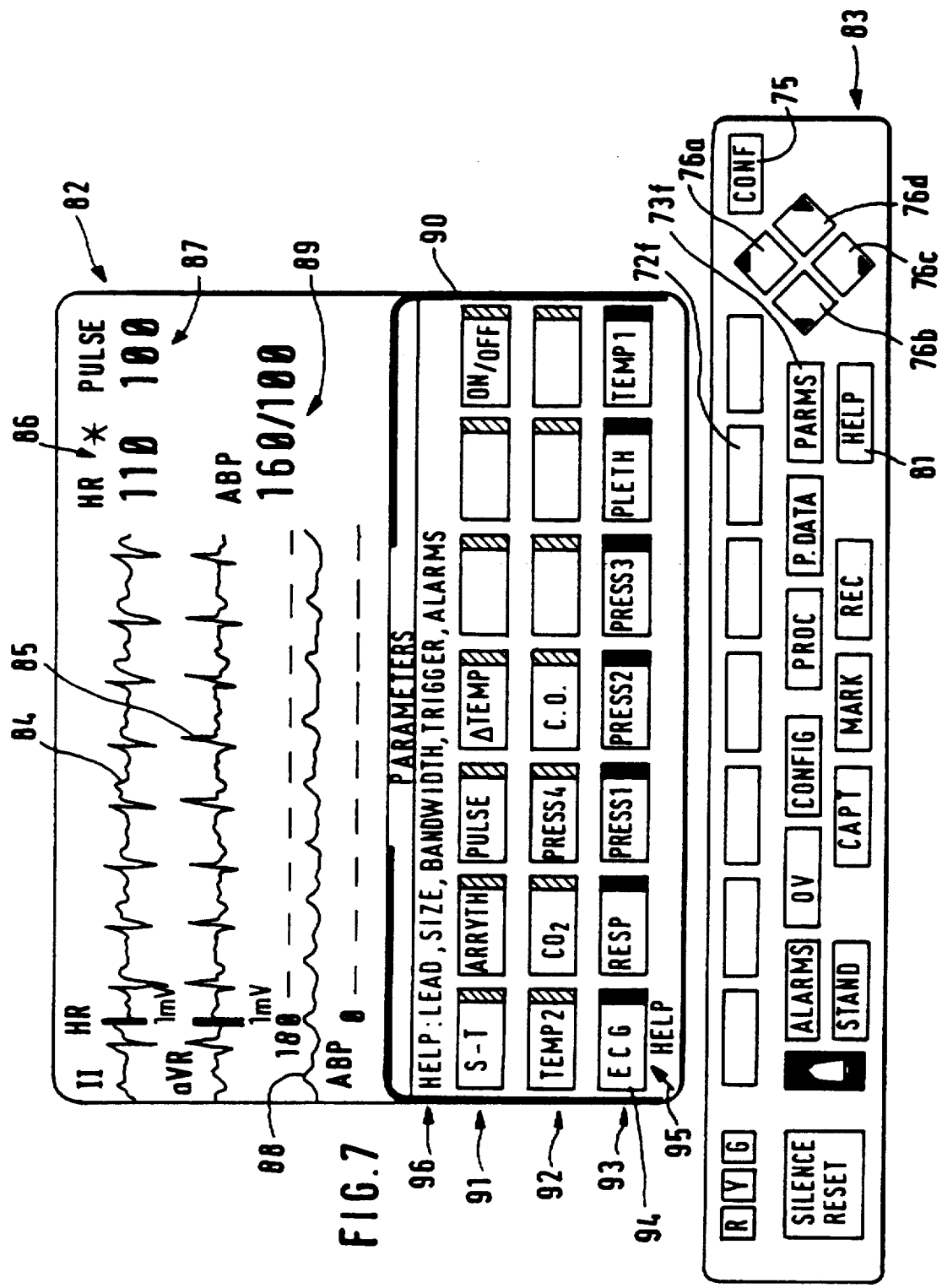
FIGS. 7 to 10 show, by way of an example, the operation of an input device for a medical monitor according to the present invention; in particular.

Keyboard 83 is the same as keyboard 71 in FIG. 6; the only difference is that the imprinted labels on the hardkeys were shortened in FIG. 7 for graphical purposes. Therefore, the keys will have the same reference numbers as in FIG. 6.

During standard operation, screen 82 merely contains patient waves and patient data. According to FIG. 7, the user has just pressed the "Parameters" key 73f to enter object mode. On the lower part of screen 82, a framed window was opened which allows the user to select a specific object of the displayed object menu. Headline "PARAMETERS" indicates that object hardkey "parameters" was pressed.

Framed window 90—which may cover part of the waves shown on the screen during a standard operation—further contains three lines of softkey labels 91, 92 and 93. In line 93, all labels are shown in full-bright inverse video which is indicated by the dark bars. This is the momentarily active softkey label line, i.e. their labels are associated with the softkeys on the keyboard. Lines 91 and 92 are not active and therefore displayed in half-bright inverse video as indicated by the half-dark-/half-light bars.

In active softkey label line 93, a leftmost label 94 is active as indicated by arrow 95. If one would, for example, press the confirm key 75, ECG would be selected as object.

The system further provides a help function; FIG. 7 shows the provided help line 96 after pressing help key 81. In this case, "HELP" does not provide general help information, but, as "ECG" is the currently active object, specific help about the tasks which can be performed on that parameter. By this, it is possible to "look behind" an object before it is selected. The same will apply later to task and action selection.

Figure 8:
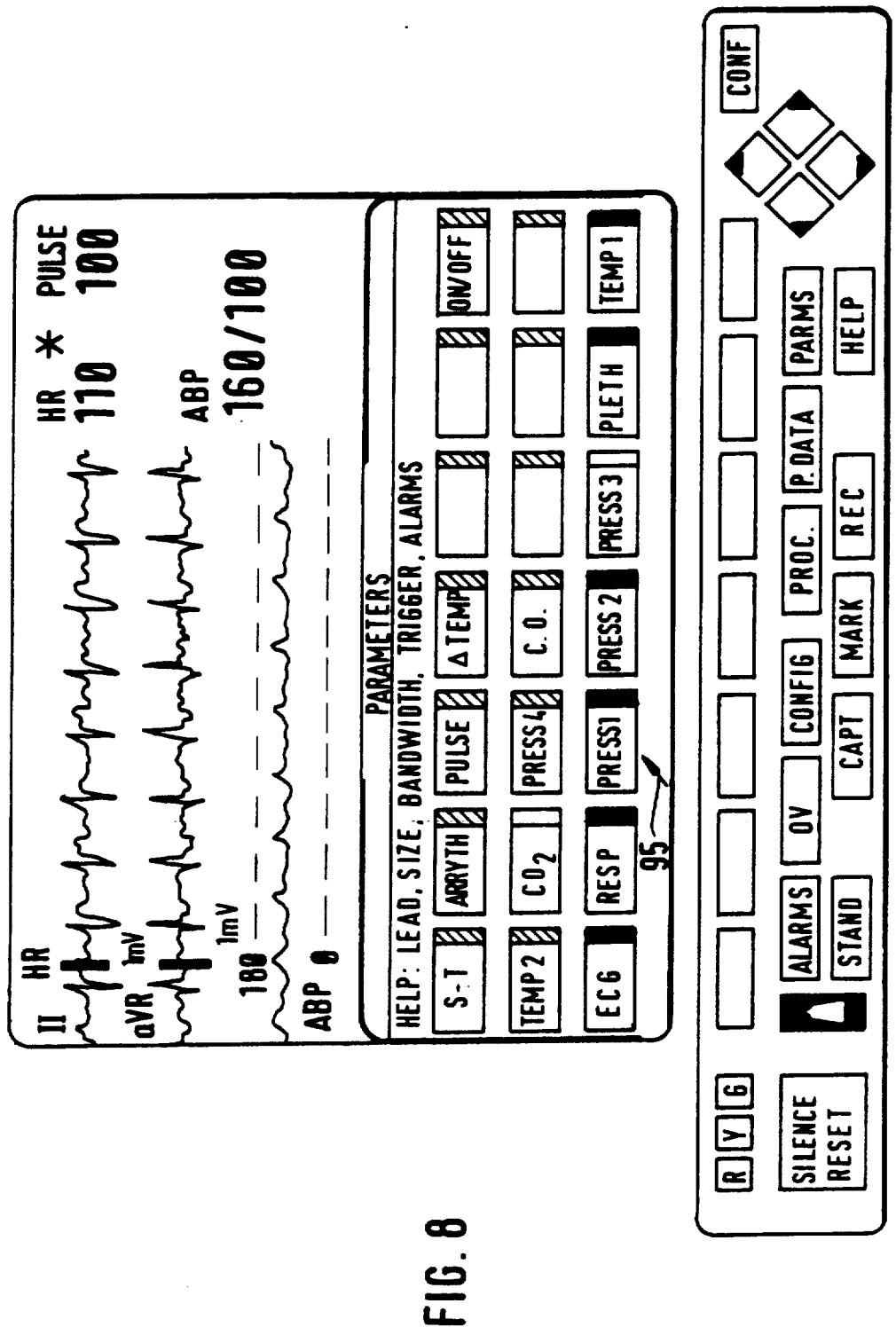

By providing various input means, all objects in window 90 may be selected. Arrow keys 76b and 76d allow to move the active softkey in horizontal direction; pressing these keys will cause arrow 95 to move right or left depending on the pressed key. FIG. 8 shows the position of arrow 95 after having pressed arrow key 76d twice.

Up/down arrow keys 76a and 76c may be used to alter the active softkey label line. For example, pressing arrow key 76a twice will cause softkey label line 91 to become the active softkey label line. The position of arrow 95 will not be changed in horizontal direction (but in vertical direction!) if that happens.

Another possibility to alter the active softkey label line would be to press the entry hardkey (which was the "parameter" hardkey 73f in this case) multiple times.

An object may also be selected by hitting one of the softkeys on keyboard 83; for example, hitting softkey 72f would cause "PLETH" to be selected. If screen 82 provides touch input, an object may also be selected by touching the appropriate softkey label on the screen; e.g. touching the "pulse" softkey label would cause "PULSE" to be selected as object immediately (it is not necessary in that case to alter the active softkey label line).

If the arrow keys or multiple hit is/are used to select a certain label in window 90, selection is only performed if confirm key 75 was pressed afterwards.

Figure 9:
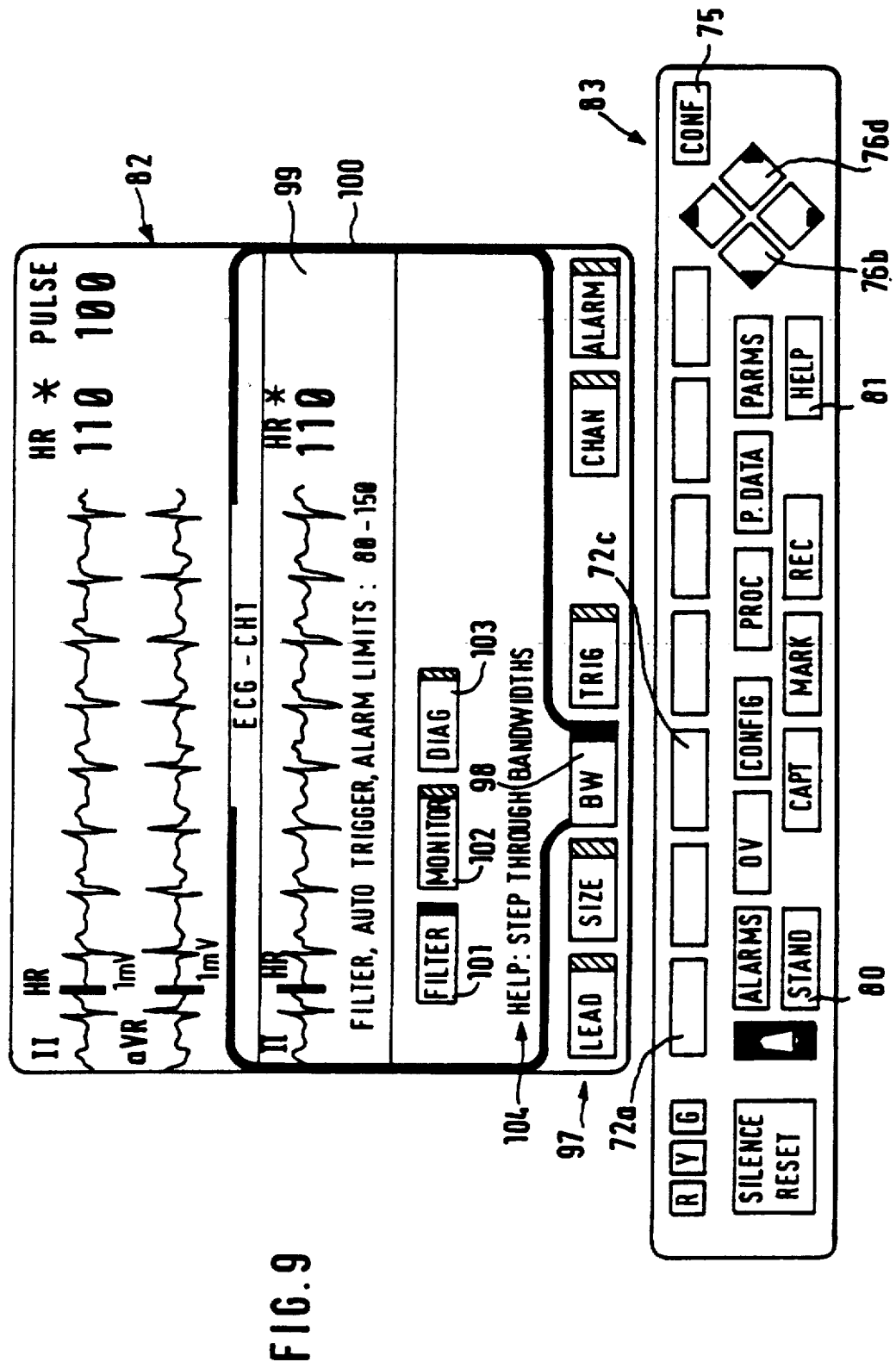

Now let us assume that ECG (Ref. No. 94) was selected as object (FIG. 9). Screen 82 will then contain a task menu in the form of a softkey label line 97. By way of that line, a specific task is assigned to the softkeys on keyboard 83. In the shown example, the tasks which may be performed on the selected object (ECG) are lead, size, bandwidth, trigger, channel and alarm. In this example, the softkey labels are shortened for graphical purposes. The detailed labels are "Change Lead", "Change Size", "Change Bandwidth", "Change Trigger", "Next Channel" and "Adjust Alarms", i.e. have a "verb plus noun" structure.

The "bandwidth" softkey (softkey 72c and softkey label 98) is currently active as indicated by the dark bar which corresponds to a full-bright inverse video label. All other tasks are currently inactive as indicated by the half-dark/half-bright bars which correspond to half-bright inverse video labels.

The active task may be altered by pressing an appropriate softkey. For example, pressing softkey 72a would cause "Lead" to become the active task.

Screen 82 further contains a window 99 with a lasso-like frame 100. The ends of that lasso are linked with the currently active softkey label, in this case "bandwidth" 98. Whenever the active task is altered, the ends of the lasso will be linked to the altered active task. In certain applications, the ends of the lasso may also be linked with the left edge of a first softkey label and the right egde of a second softkey label which is right to said first softkey label. In this case, both the first and the second softkey are active.

Window 99 contains the action menu associated with the currently active task "bandwidth". The upper part of window 99 contains a copy of the realtime wave associated with the selected object—in this case, the ECG wave—, and the current adjustment of that object. The lower part contains three actions which may be performed on the selected task "bandwidth", in the shown example bandwidth "filter", bandwidth "monitor" and bandwidth "diagnostic". Action "filter" (Ref. No. 101) is the currently active action as indicated by the dark bar; 102 and 103 are the other available actions.

The specific action may now be selected by use of various input means: for example, left/right arrow keys 76b and 76d may be used to step through actions 101 to 103. Multiple hit of the active task softkey 72c would also cause "stepping" through the available tasks. The action to be performed may now be finally selected by means of confirm key 75.

Of course, touch input may also be used to select an action by touching one of the rectangles 101, 102 or 103.

Pressing the "help" key 81 will provide specific help information related to the active task key; in the shown example, help line 104 provides help information about ECG bandwidth.

The task/action menu may be left by pressing the "standard" key 80. The described input device does not provide automatic return to the standard display to ensure system consistency.

Figure 10:
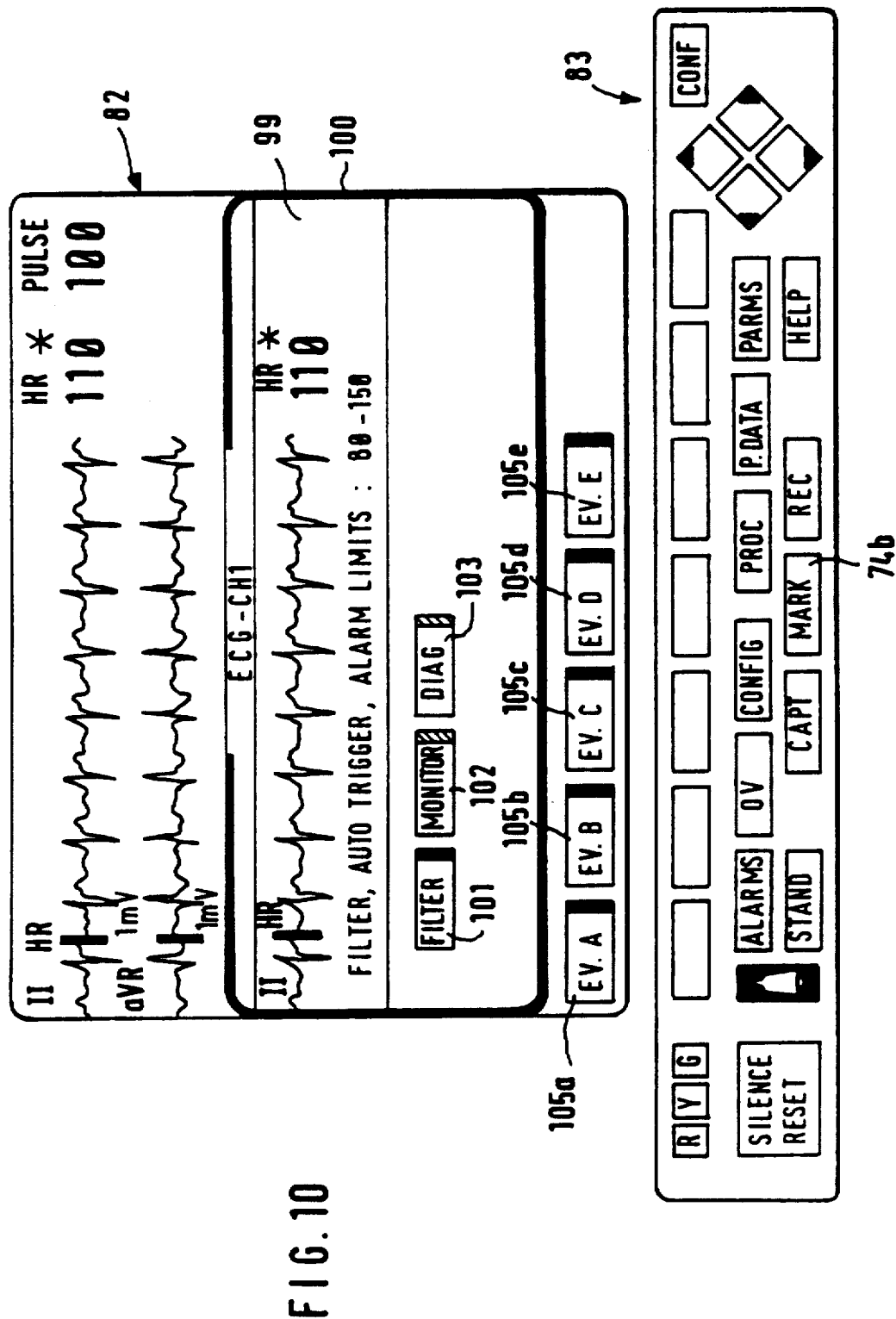

FIG. 10 depicts screen 82 and keyboard 83 after an "immediate action". That immediate action happened whilst being in task mode as shown in FIG. 9.

Screen 82 shows all waves and alphanumerics not covered by menus or overlays. In the shown example, the "mark event" key 74b was pressed to mark a transient event. The system performs the associated action immediately to ensure that no data are lost. After having performed that action, a "request mode" is entered to allow the user to enter additional information which may make re-identification of the event easier. FIG. 10 shows a set of softkey labels 105a through 105e which allow the user to mark an event as "Event A" through "Event E". The lasso was temporarily closed in this case. After having marked the event, the system returns (in that case) automatically to task/action input mode (and opens the lasso again).

We claim:

1. A medical monitoring system comprising:
   a display means for displaying medical parameters from a plurality of medical monitors,
   a keyboard, and
   a processor for responding to the keyboard to control display actions of the display means, the display actions comprising:
   a first display of physiological waves of plural medical parameters,
   a second display, caused by the processor in response to actuation of a hardkey, of a menu of medical parameters as objects to be manipulated, the menu positioned as a window partially covering the first display, and serving as soft key labels; and
   a third display, caused by the processor in response to soft key selection of a medical parameter from the menu of medical parameters, of a task menu of tasks available to be performed relative to a selected medical parameter, the task menu replacing the menu of medical parameters to serve as soft key labels, there being displayed with the task menu a selection of actions within a window which only partially covers the first display and is linked to a selected task, the actions being only those available to be selected and performed relative to the selected task, the processor responding to the selection of any other selected task from the task menu to display only actions available relative to the other selected task, there being displayed in the window a physiological wave of the selected medical parameter upon which an action is to be performed.

2. A medical monitoring system as claimed in claim 1 wherein the processor further responds to an arrow key or multiple hits of a task window softkey to select an action.

3. A medical monitoring system as claimed in claim 1 wherein the menus serve as touch screen key labels.

4. A medical monitoring system as claimed in claim 1 wherein said keyboard further comprises a "help" key, the processor responding to the help key when the medical parameter menu is displayed to display with the menu the tasks available for an active medical parameter.

* * * * *